May 22, 1945. H. G. W. YOUNG 2,376,843
DEVICE FOR SLICING EDIBLES
Filed Dec. 4, 1942 4 Sheets-Sheet 1
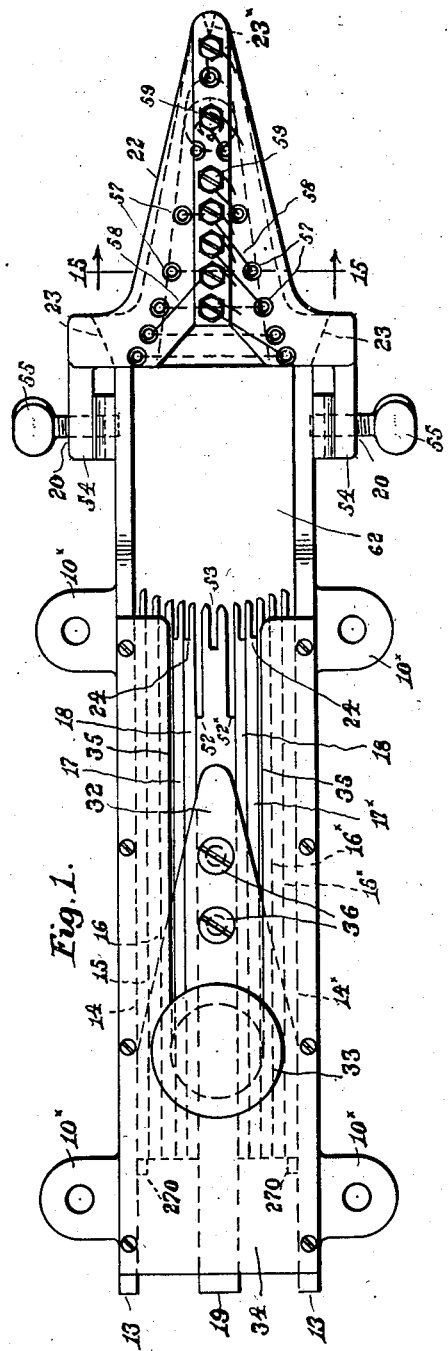
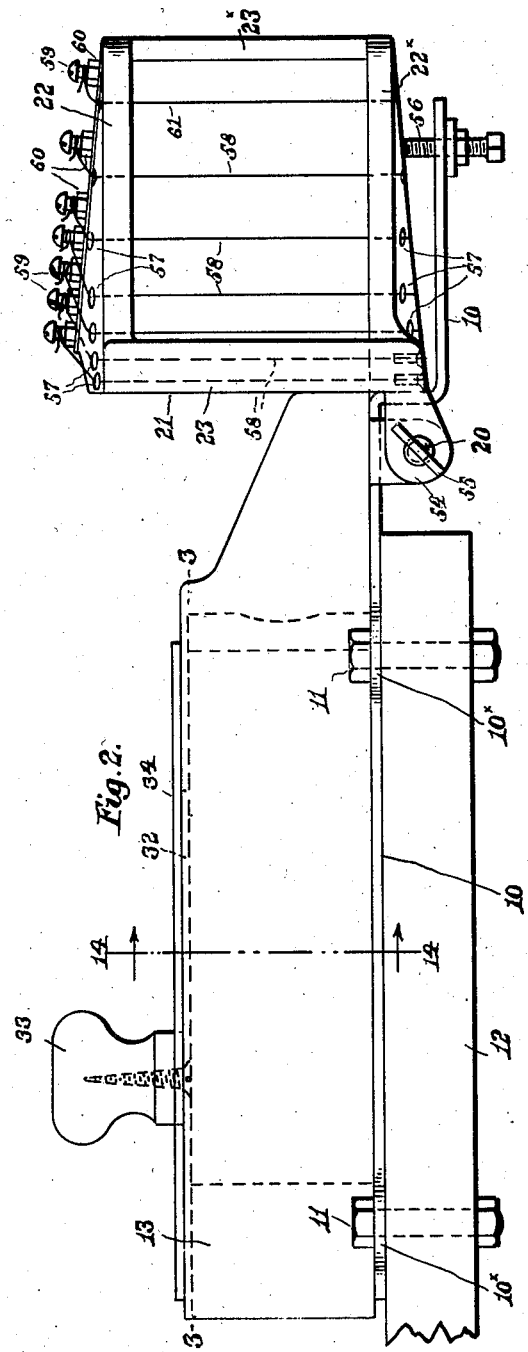
Inventor:
Henry G. W. Young,
by Walter E. Lombard,
Atty.

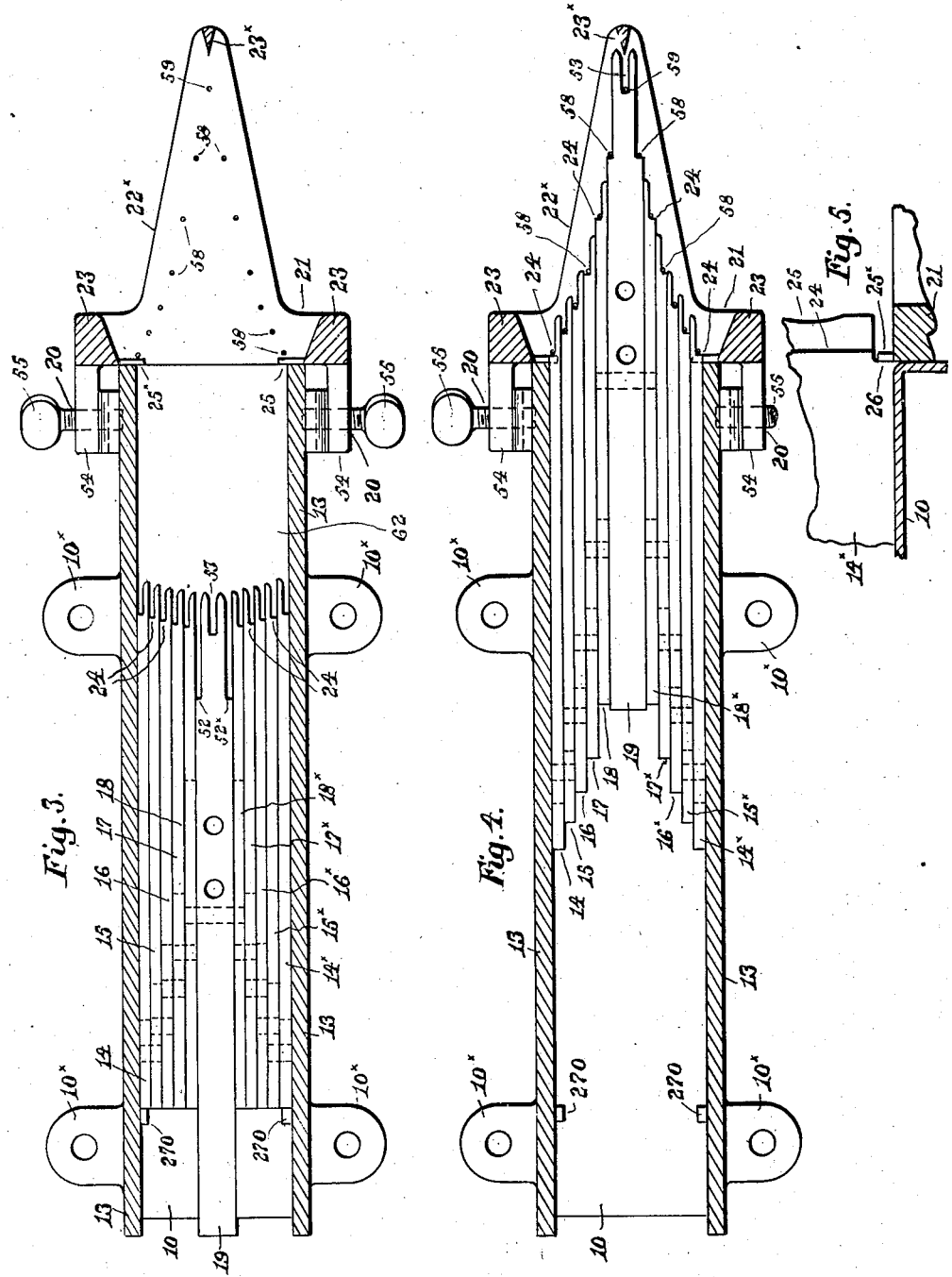

May 22, 1945.　　　H. G. W. YOUNG　　　2,376,843
DEVICE FOR SLICING EDIBLES
Filed Dec. 4, 1942　　　4 Sheets-Sheet 3
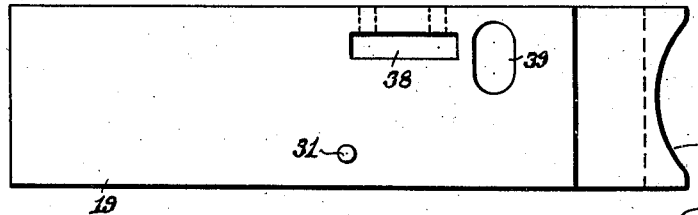
Fig. 6.
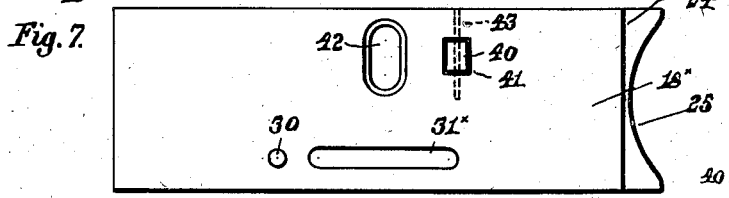
Fig. 7.
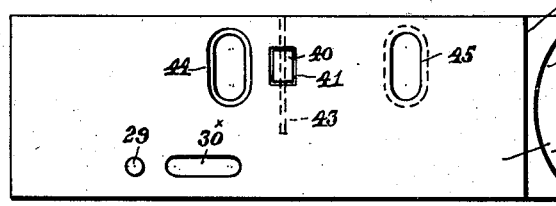
Fig. 8.
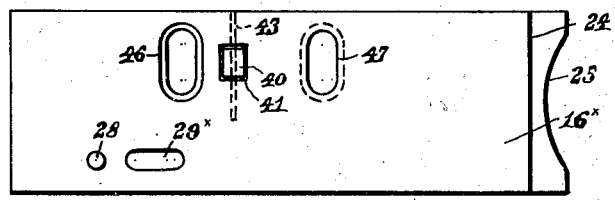
Fig. 9.
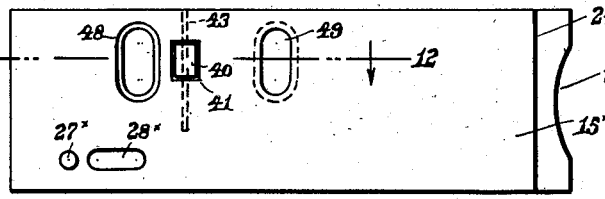
Fig. 10.
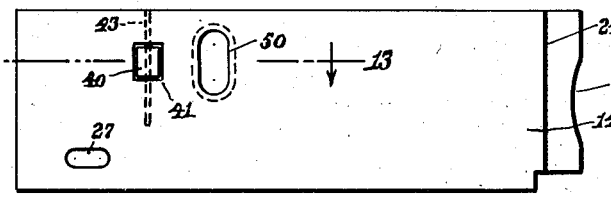
Fig. 11.
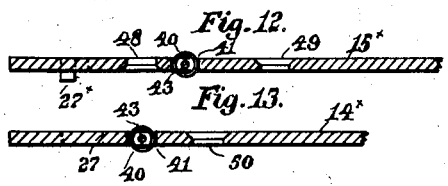
Fig. 12.
Fig. 13.
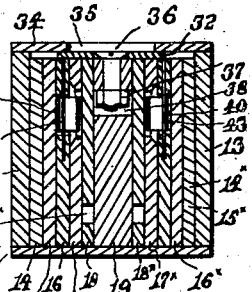
Fig. 14.
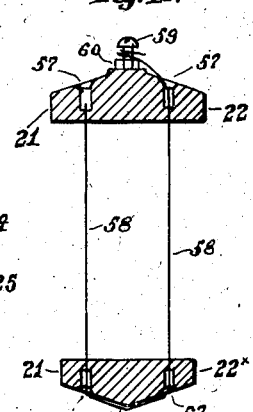
Fig. 15.
Inventor:
Henry G. W. Young,
by Walter E. Lombard, Atty.

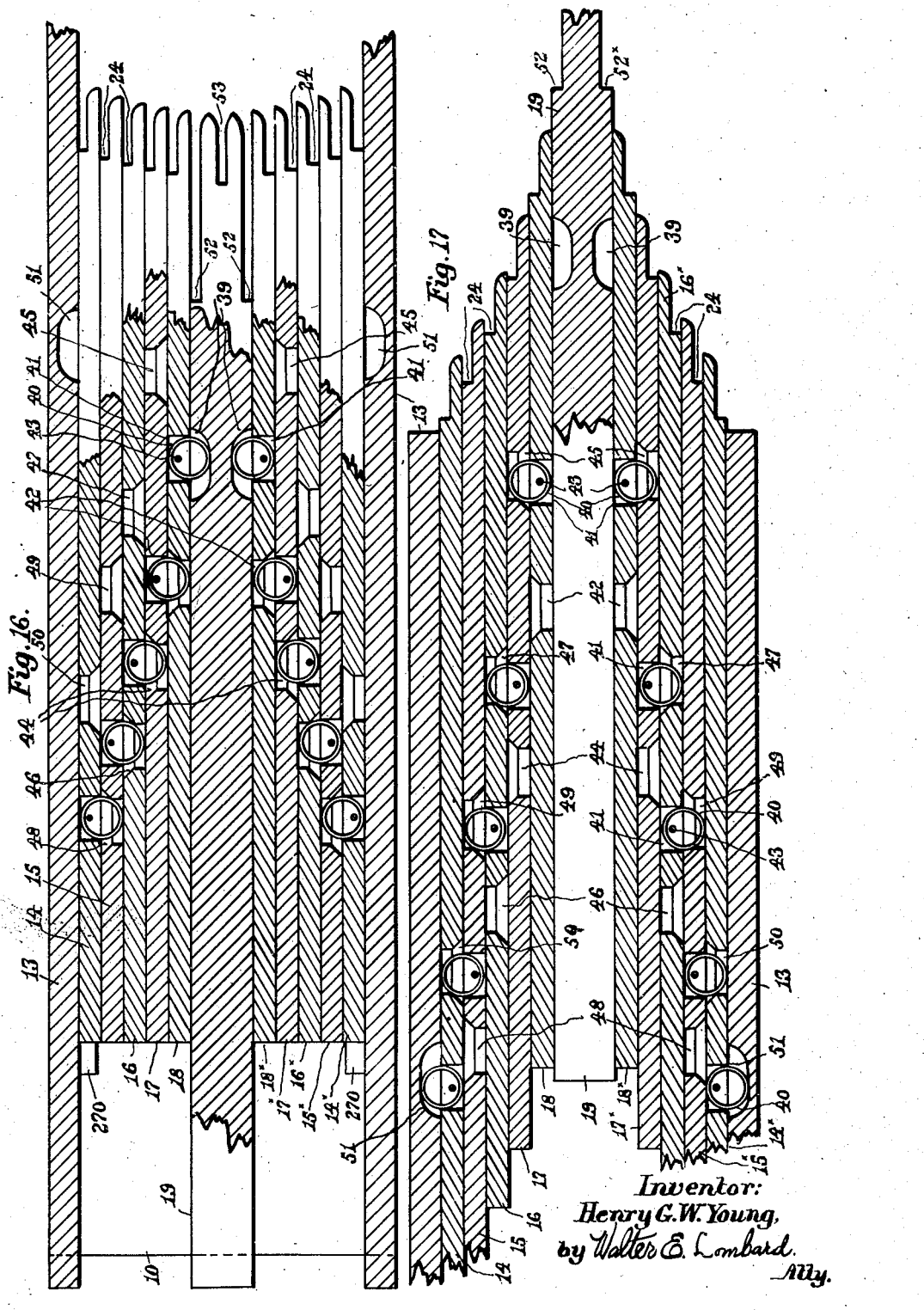

Patented May 22, 1945

2,376,843

UNITED STATES PATENT OFFICE 2,376,843

DEVICE FOR SLICING EDIBLES

Henry G. W. Young, Cambridge, Mass.

Application December 4, 1942, Serial No. 468,167

18 Claims. (Cl. 146—169)

This invention relates to devices for cutting edibles and has for its object the provision of a machine which is adapted to cut vegetables and fruit into slices.

One of the main objects of the invention is to provide a machine of this character which may be used to cut a boiled potato into slices preparatory to frying the same or using said slices in salads.

Another object of the invention is the provision of means whereby the slicing of the edible may be accomplished by means of taut wires and thus dispensing with the use of cutting knives.

A further object of the invention is the production of a machine of this character which will be of simple construction and can be manufactured at a minimum cost.

The objects of the invention are attained by the instrumentalities shown in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents a plan of a device embodying the principles of the present invention.

Figure 2 represents a side elevation of the same.

Figure 3 represents a section on line 3, 3 on Fig. 2 with the slidable plates in their rearmost position.

Figure 4 represents a similar section with the said plates in their forward position.

Figure 5 represents a sectional detail showing the stop member for limiting the forward movement of the outermost plates.

Figure 6 represents an elevation of the central plate.

Figures 7 to 11 inclusive represent elevations of the five plates at one side of the central plate.

Figure 12 represents a horizontal section on line 12, 12 on Fig. 10.

Figure 13 represents a horizontal section on line 13, 13 on Fig. 11.

Figure 14 represents a horizontal section on line 14, 14 on Fig. 2.

Figure 15 represents a vertical section on line 15, 15 on Fig. 1.

Figure 16 represents an enlarged horizontal section on the same lines as 12, 12 on Fig. 10 and 13, 13 on Fig. 11, the various plates being shown in their rearmost position, and Figure 17 represents a similar section with the plates in their extreme forward position.

Similar characters indicate like parts throughout the several figures of the drawings.

In the drawings, 10 is a trough provided with ears 10x to receive bolts 11 by which the trough may be secured firmly to a shelf or other support 12.

Within the trough 10 and between the sides 13 thereof are a plurality of separately additive slidable plates 14, 15, 16, 17 and 18 on one side of a central operating plate 19, on the other side of which are the slidable plates 18x, 17x, 16x, 15x and 14x.

At the forward end of the trough 10 and pivoted thereto at 20 is an extension 21 having triangular top and bottom plates 22, 22x spaced apart and connected together at their three corners by uprights 23, 23 and 23x.

There are no side walls to the extension 21, the spaces between the uprights 23, 23 and 23x thereof being open at each side and at the rear.

Each of the plates 14 to 18 inclusive and 14x to 18x inclusive have at the forward end thereof a shoulder 24, these shoulders of the different plates extending outwardly from the center of the entire group of plates.

Preferably the forward end of each of the slidable plates has a slight curvature therein as indicated at 25 in Figs. 6 to 11 inclusive, each inner plate heaving a deeper curvature 25 than that of the plate adjacent the outer face of each inner plate.

At the rear of the bottom 22x of the extension 21 are two stop members 25x, as shown in Fig. 5, and when in the forward movement of the plates 14, 14x the shoulders 26 thereon come into contact with these stop members 25x all further forward movement of these outermost plates 14, 14x is prevented.

Each of the plates 14, 14x has an elongated slot 27 therein into which projects a pin 27x extending outwardly from the adjacent plate 15 or 15x, and as a consequence when the plates 14, 14x reach the end of their forward movements all the other plates may continue to move forward until the pins 27x come into contact with the forward ends of the slots 27 when further forward movement of the plates 15, 15x is stopped. The forward movement of the other plates 16, 17, 18, 19, 16x, 17x and 18x are successively stopped when the pins 28 in plate 16 and 16x come to the forward ends of the slots 28x in plates 15; when the pins 29 in plates 17, 17x reach the forward ends of the slots 29x in plates 16, 16x; when the pins 30 in plates 18, 18x reach the forward ends of the slots 30x in plates 17, 17x; and when the pins 31 in plate 19 reaches the forward ends of the slots 31x in the plates 18, 18x.

When the plates start to move forward they are in the position shown in Figs. 1 and 2, and when they are at the end of their forward movement they are in a position shown in Fig. 4.

The pins 27x and 29 to 31 inclusive are all located at predetermined points on their respective plates and this is also true of the slots to receive these pins.

Moreover, the lengths of these slots 27, 28x to 31x inclusive must be predetermined in order to have all the slidable plates stop at the right time and in the desired positions relative to each other as shown in Fig. 4.

When the plates are moved rearwardly from the position shown in Fig. 4, they move together until the outer plates 14, 14x come into contact with the stop members 270 shown in Fig. 4 of the drawings, thus preventing any further rearward movement of these plates 14, 14x.

The other plates continue in their rearward movement until they are successively stopped by the pins 27x, 28, 29, 30 and 31, reaching the rear ends of the slots 27, 28x, 29x, 30x and 31x when all of the plates will be brought to a standstill in their original positions as shown in Fig. 3.

The central operating plate 19 has secured thereto a plate 32 to which is secured a knob 33 providing a means whereby the operator may push forward the central plate 19 and the other plates on either side thereof until they are stopped in the position shown in Fig. 4.

Secured to the top of the sides 13 of the trough 10 is a cover plate 34 having a slot 35 at the forward end, which slot 35 has parallel sides serving as a guide for the operating knob 33, which is adapted to be used in moving the plate 19 forwardly and rearwardly.

The plate 32 is secured to the plate 19 by screws 36 threaded to checknuts 37 in an aperture 38 extending through said plate 19.

The central plate 19 has in its opposite sides concaved depressions 39 in which extend tubular members 40 located in vertical slots 41 in the plates 18 and 18x, and these plates 18, 18x have extending therethrough openings 42 with inclined sides adjacent the side faces of the plates 17, 17x, and in these openings 42 extend similar tubular members 40 which are located in slots 41 in plates 17, 17x.

In all the plates, except 19, the tubular members 40 are retained in the respective slots 41 by means of vertical pins 43 embedded in the various slidable plates.

The slidable plates 17, 17x each have an opening 44 therethrough similar to the opening 42, and also another similar opening 45 facing in the opposite direction as shown in Fig. 8.

Rollers 40 in plates 16, 16x extend into the openings 44. The plates 16, 16x each have similar openings 46 and 47 therein as shown in Fig. 9, and extending into the openings 46 are rollers 40 disposed in the plates 15, 15x.

These plates 15, 15x each have similar openings 48, 49 therein as shown in Fig. 10, and into each of the openings 48 extends a roller 40 in the plate 14 or 14x.

The plates 14, 14x have only one roller-receiving opening 50 therein, the inclined sides of which are on the inner side thereof.

When the rollers 40 in some of the plates are in any of the openings in adjacent plates, there is some lost motion when one plate moves relatively to another plate, as clearly shown in Figs. 16 and 17.

The diameter of each roller is almost equal to the thickness of two plates and are ordinarily free to rotate without performing any function.

When the various slidable plates are in the position shown in Fig. 16, the first forward movement of the central operating plate 19 will cause the lost motion in the slots of said plates to be taken up and then all of these plates will be moved forward together, with their forward ends substantially in the position shown in Fig. 16.

When the shoulders 26 on the forward ends of the plates 14, 14x come into contact with the stop members 25x (see Fig. 5), further forward movement of these plates 14, 14x will be prevented, but the remaining plates will continue to move forward. At this time the rollers 40 in slots 48 in plates 15, 15x will enter the depressions 51 in the side walls 13 of the trough 10, and be disengaged from the plates 15, 15x, thereby permitting forward movement of said plates 15, 15x, the plates 14, 14x remaining at a standstill.

The forward movement of plates 15, 15x will bring the rollers 40 in plates 15, 15x opposite the slots 50 in plates 14, 14x, permitting said rollers in slots 46 to enter said slots 50 and become disengaged from the plates 15, 15x, which then come to a standstill.

The plates 16, 16x then move forward until the rollers 40 therein come opposite the slots 49 in plates 15, 15x, thus allowing said rollers to enter said slots 49 in plates 16, 16x, thereby releasing the plates 17, 17x so that they may be moved forward.

When the rollers 49 in plates 17, 17x come opposite the slots 47 they will enter said slots 47, releasing the plates 18, 18x so that these plates 18, 18x when thus released may be moved forward.

When the rollers 40 in plates 18, 18x come opposite the slots 45 in plates 17, 17x these rollers will enter said slots 45 and release the plate 19 so that it may be moved to the end of its forward movement, as shown in Fig. 17.

When the plate 19 is moved rearwardly, the other plates 18 to 14 and 18x to 14x will successively be picked up by a reversal of the movements just described, until the outer plates 14, 14x come into contact with the stop members 270 and all of plates be their original positions as shown in Fig. 4.

When the rollers 40 are in the positions shown in Fig. 16, they are free to revolve about the supporting pin 43 which performs only one function and that is the retaining of the rollers 40 in their respective slots when the plates are removed from the trough 10.

When the plates are moved forward or backward, the curved or inclined walls of depressions 39, 51 and slots 45 to 50 inclusive, coming into contact with rollers 40, cause said rollers to be forced outwardly from said depressions and slots of the different plates and impinge upon the walls of other adjacent plates, thus causing the two plates to be moved together until released from contact in the manner just described.

The actual stopping of the various plates is performed by the pins 27x and 28 to 31 inclusive coming into contact with the ends of slots 27 and 28x to 31x, as shown in Figs. 6 to 13 inclusive.

The slidable plates may all be made of plastic material, such as Bakelite.

The forward end of the operating plate 19 has oppositely disposed shoulders 52, 52x, and a central vertical slot 53. The extension 21 has rearwardly extending ears 54 through which extend screws 55 by which said extension 21 is pivotally connected to the forward end of trough 10, as shown in Figs. 1 to 4 inclusive.

The projecting forward end of the bottom 10 is provided with an adjustable member 56 engaging the under face of the bottom 22x of the extension 21 in order by adjustment to keep the extension 21 horizontal.

The top plate 22 and bottom plate 22x are provided with a plurality of holes 57 which holes in plan are in V-shaped formation, as shown in Fig. 1.

In a hole 57 in the upper plate 22 is anchored a fine cutting wire 58 which extends downwardly through an opening 57 in the bottom plate 22x, and then upwardly through holes 57 in the bottom plate 22x and upper plate 22, the upper end of said wire extending through a hole in the shank of a screw 59 threaded to said upper plate 22.

By turning said screw 59, the wire 58 may be drawn taut and held taut by the check nut 60, preventing the rotation of said screw 59, all as shown in Figs. 1, 2 and 5. The foremost wire 61 is anchored at the lowest end in a hole 57 in the bottom plate 22x and extends upwardly through a hole 57 in the top plate 22, and is kept taut by a screw 59 and the check nut 60. The shoulder in the bottom of slot 53 in plate 19 never comes into contact with the cutting wire 61 as the forward movement of said plate is stopped just as said shoulder reaches said wire.

This is also true of the shoulders 42 on the other plates 14 to 18 inclusive and 14x to 18x inclusive, each plate being stopped in the forward movement before the shoulder thereof comes into contact with a wire 58.

When it is desired to slice a boiled potato or some other edible, the edible is fed into the trough 10 at 62 and then the operator seizes the knob 33 and pushes forward the plate 19 and the other plates coacting therewith, thereby pushing the edible forward to the cutting wires 58 and 59, said wires passing through the edible and slicing the same, the various slices dropping downwardly from both sides of the bottom plate 22x into a receptacle provided to receive the slices as they are cut from said edible.

The member 23x is wedge-shaped as indicated in Figs. 1 and 3 of the drawings, and serves to separate the last slices cut and force these slices outwardly.

The extension 21 may be removed from the trough 10 to permit the cleaning of said extension, and other elements of said device.

From the foregoing explanation it is believed that the operation of the invention will be understood readily and no further description is necessary.

Having thus described my invention, I claim:

1. In a device for slicing edibles, the combination of a trough; a forward extension thereto provided with a plurality of vertically disposed taut wires; a plurality of separately additive slidable plates having shoulders at their forward ends and forming a unitary whole within said trough with successively additive engaging means associated with said unit for moving said plates, and adapted to permit continued movement of some of said plates when movement of other of said plates is arrested.

2. In a device for slicing edibles as set forth in claim 1, in which said taut wires in plan are disposed in V-shaped formation with the apex of said V disposed away from said sliding plates.

3. In a device for slicing edibles as set forth in claim 1, in which means including a determinate stop element disposed in the path of each of said plates is provided whereby in the forward movement of said plates the outer plates are stopped first and the next inner plates are sequentially moved forward and successively stopped until the center plate is stopped at a foremost position.

4. In a device for slicing edibles as set forth in claim 1, in which said extension is provided with means to tighten said vertical wires.

5. In a device for slicing edibles as set forth in claim 1, in which said forward extension is removably connected to the forward end of the trough.

6. In a device for slicing edibles as set forth in claim 1, in which said trough is provided with a forwardly projecting plate including an adjustable member coacting with the bottom of said extension and supporting the same.

7. In a device for slicing edibles as set forth in claim 1, in which each plate is provided with a pin extending into an elongated horizontal slot in an adjacent plate.

8. In a device for slicing edibles as set forth in claim 1, in which said extension consists of triangular top and bottom plates spaced apart and connected together by uprights at the three corners thereof.

9. In a device for slicing edibles as set forth in claim 1, in which said extension consists of triangular top and bottom plates spaced apart and connected together at the three corners thereof by uprights, said plates having openings therein to receive said taut wires, each wire being anchored in an opening in the top plate and extending downwardly through an opening in the bottom plate and then upwardly through openings in both plates with its upper end coiled about the shank of a wire tightening screw threaded to said top plate.

10. In a device for slicing edibles as set forth in claim 1, in which said shoulders on said slidable plates extend outwardly from the center of the group of plates.

11. In a device for slicing edibles as set forth in claim 1, in which said shoulders are formed in the inner ends of vertical slots in the forward ends of said slidable plates.

12. In a device for slicing edibles as set forth in claim 1, in which each slidable plate has a pin extending into an elongated slot in an adjacent plate, said slots being of predetermined lengths and disposed at predetermined points in horizontal alinement.

13. In a device for slicing edibles as set forth in claim 1, in which fixed stops at the rear end of said extension limit the forward movement of the outermost slidable plates.

14. In a device for slicing edibles as set forth in claim 1, in which fixed stops on the trough limit the outermost slidable plates on the rear movement of said plates.

15. In a device for slicing edibles as set forth in claim 1, in which each slidable plate is provided with a vertical slot at a predetermined point having a vertical pin extending therethrough loosely surrounded by a tubular member adapted in the movement of said plate to enter another opening with inclined sides located at a predetermined point in an adjacent slidable plate.

16. In a device for slicing edibles as set forth in claim 1, in which each slidable plate is provided with an opening therethrough at a predetermined point and having disposed therein a revoluble member adapted in the movement of said plate to enter another opening with inclined walls located at a predetermined point in an adjacent slidable plate.

17. In a device for slicing edibles, the combination of a trough; a plurality of cutting members at one end thereof; and a plurality of independently slidable plates in said trough together with means operable by movement of said plates whereby said plates are moved as a unit to a determinate point and thereafter said plates are sequentially moved to different positions and to a cooperating relation with said cutting members and successively cut slices from said edibles.

18. In a device for slicing edibles, the combination of a trough; a plurality of cutting members at one end thereof; and a plurality of slidable plates in said trough, means to which force may be applied to move said plates with interlocking means associated with said plates whereby movement of said plates is effected in sequence to determinate stop position into cooperating relation with said cutting members and successively cut slices from said edibles, said interlocking means being interposed between said plates in a manner to cause them to move together until the forward movement of each plate is stopped.

HENRY G. W. YOUNG.